G. G. EARL.
AUTOMATIC CONTROLLING OR RECORDING APPARATUS.
APPLICATION FILED JAN. 3, 1910.
1,174,241.       Patented Mar. 7, 1916.
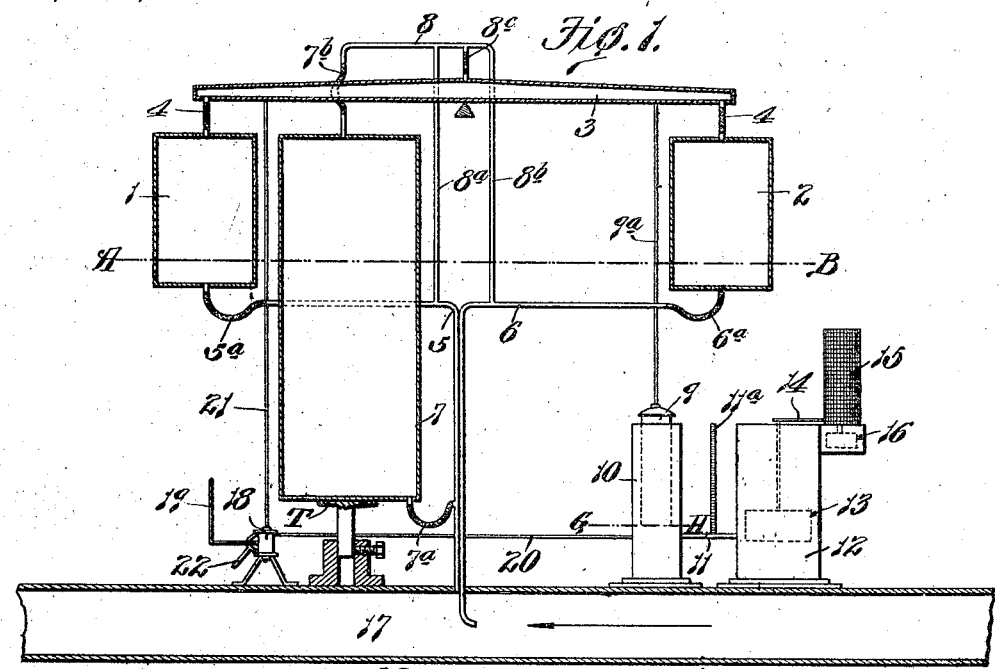
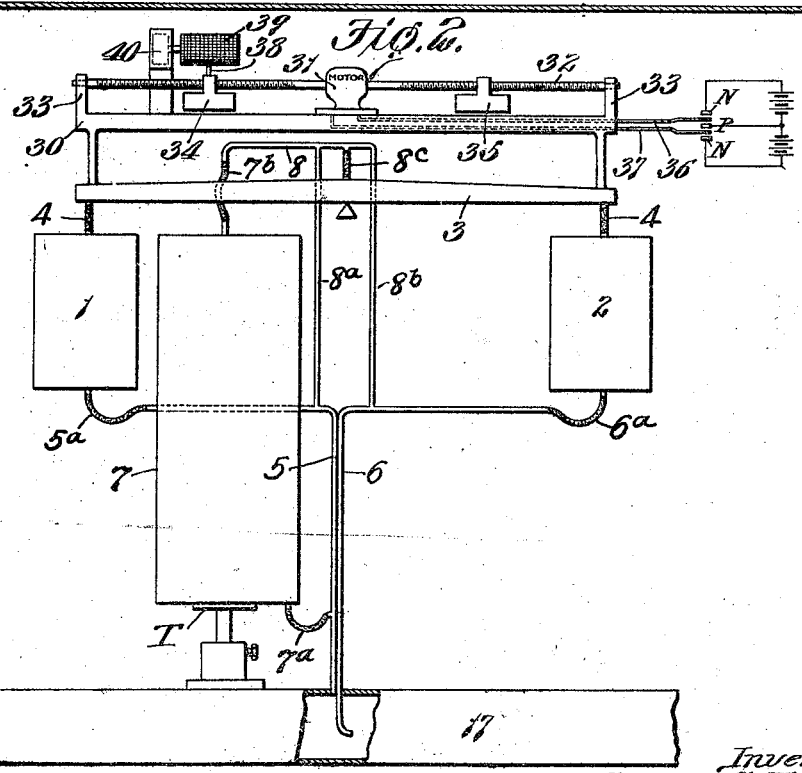
Witnesses:                Inventor.
                          George G. Earl.
                          By Paul Bakewell, Atty.

UNITED STATES PATENT OFFICE.

GEORGE G. EARL, OF NEW ORLEANS, LOUISIANA.

AUTOMATIC CONTROLLING OR RECORDING APPARATUS.

1,174,241. Specification of Letters Patent. Patented Mar. 7, 1916.

Application filed January 3, 1910. Serial No. 536,249.

*To all whom it may concern:*

Be it known that I, GEORGE G. EARL, a citizen of the United States, residing at New Orleans, Louisiana, have invented a certain new and useful Improvement in Automatic Controlling or Recording Apparatus, of which the following is a full, clear, and exact description, such as will enable others skilled in the art to which it appertains to make and use the same.

This invention relates to devices or apparatuses that are employed for automatically controlling or actuating an independent mechanism, such, for example, as a recording or indicating device or a valve for governing the flow of a liquid.

One object of my present invention is to provide an apparatus of novel construction for recording the readings of a Pitot tube.

Another object is to provide an apparatus of novel construction for automatically controlling a pressure-regulating valve.

Other objects and desirable features of my invention will be hereinafter pointed out.

Figure 1 of the drawings illustrates an apparatus embodying my invention for recording the readings of a Pitot tube; and Fig. 2 illustrates an apparatus for the same purpose but of slightly different construction.

Referring to Fig. 1 of the drawings, 1 and 2 designate closed cylinders of equal weight which are suspended from a hollow beam 3 by means of hollow flexible connections 4. The reference characters 5 and 6 designate the static and velocity tubes, respectively, the latter here shown as a Pitot tube, the static tube 5 being connected to the lower end of the cylinder 1 by a hollow flexible connection 5ª, and the velocity tube 6 being connected to the lower end of the cylinder 2 by a hollow flexible connection 6ª. A closed cylinder 7, which is mounted on a vertically adjustable table T, is connected to the lower end of the static tube 5 by means of a hollow flexible connection 7ª, and a hollow flexible connection 7ᵇ leads from the upper end of the cylinder 7 into a header 8 having branches 8ª and 8ᵇ that lead to the static tube 5 and the velocity tube 6, respectively, and also a flexible leg or extension 8ᶜ that is tapped into the hollow beam 3 which carries the cylinders 1 and 2. A cylindrical-shaped member 9 here shown as a weight which is connected to one end of the beam 3 by means of a rod 9ª, is arranged inside of a tank 10, and a pipe 11 leads from said tank 10 into a tank 12 inside of which a float 13 is arranged, said float being provided with a recording pen or needle 14 which is adapted to operate on a chart on a recording drum or cylinder 15 that is driven by a clock-work 16 or some other suitable mechanism. The tube 11 which establishes communication between the tanks 10 and 12, is provided with a vertically disposed leg or extension 11ª formed of glass or some other suitable transparent material, and said extension 11ª is graduated so as to form a visual indicating device that will show the level of the liquid in the tanks 10 and 12. The member 9 is of a weight in excess of its displacement so that it will act as a weight even when it is completely submerged, but the cylinders 1 and 2 are not weighted.

The system is in balance when there is no water around the weight 9 and when the level of the water in the cylinders 1 and 2 stands at a certain point, such, for example, as indicated by the broken line A—B in Fig. 1. As the cylinders 1, 2 and 7 and the hollow beam 3 that communicates with said cylinders, form an open system which is connected to the pressure main 17 by the static and velocity tubes 5 and 6, it is evident that any water entering the main or conduit 17 will cause a compression of air in the system, this compression of air varying with the pressure of the water in the conduit 17. The water flows through the main or conduit 17 in the direction indicated by the arrow in Fig. 1, and if no flow exists in said conduit, the water will rise to the same height in the cylinders 1, 2 and 7. By raising or lowering the table T on which the cylinder 7 is mounted, the level of the water can be adjusted to the point indicated by the dotted line A—B. If the level of the water in the tank 10 stands at the point indicated by the broken line G—H, and if the level in 1 and 2 is at the line A—B or at an equal height, the system will then be in balance, and if a flow of water is then permitted through the conduit 17 the level will tend to rise in the velocity tube 6 and this will raise the level in the cylinder 2, thereby unbalancing the system and causing cylinder 2 to descend. The movement of the beam 3 in this direction causes the piston of the pilot valve 18 to open and thus permit water to pass from a pressure line 19 through a pipe 20 into the tank 10 and thus raise the level in said tank and in the tank 12 in which the float of the recording pen is arranged, the means herein shown for actuating the piston of the pilot valve 18 consisting of a rod 21 that is connected to said piston and to the beam 3. When the level in the tank 10 has risen far enough to increase the sustaining force on the weight 9 sufficiently to offset the increased weight in cylinder 2, due to the rise occasioned by the velocity tube, the equipoise of the system will be restored and the piston of the pilot valve 18 will be moved in the opposite direction so as to cut off the flow of water from the pressure line 19 into the tank 10. If the level in cylinder 2 should then fall said cylinder would rise and thus cause the piston of the pilot valve 18 to be moved in such a direction that the water in tank 10 could drain out of same through the pipe 20 into a waste-pipe 22, thus reducing the sustaining force on the weight 9 so that said weight will descend, the downward movement of said weight restoring the equipoise of the system and moving the piston of the pilot valve 18 into such position that the pipe 20 is closed. The apparatus when properly calibrated will indicate every increase or decrease of flow in the conduit 17 by a certain known change of level in cylinder 2, and as this increase or decrease will be communicated to the tanks 10 and 12 it is evident that any change of level in cylinder 2 above a corresponding change of level in cylinder 1 will be duplicated by a corresponding proportional increase or decrease of level in tanks 10 and 12. Consequently, an accurate record of the difference in level in cylinders 1 and 2 will be obtained by the float 13 of the recording pen 14 rising and falling as the level of the liquid in tank 12 varies, and as such difference of level may be made to indicate the rate of flow through the conduit 17 it is evident that the apparatus will act as a flow recorder.

In Fig. 2 I have shown an apparatus of slightly different form for accomplishing the same results as the apparatus shown in Fig. 1, the only difference between said apparatuses, however, being in the recording mechanism and in the substitution of other means than the pilot valve 18, weight 9, and tank 10 for restoring the equipoise of the system. The valve 18 is illustrated in detail in my co-pending application #536,239, Jan. 3, 1910. In the construction shown in Fig. 2 a frame 30 is connected to the beam 3, and a small electrically-operated shunt wound motor 31 is mounted on said frame. The shaft 32 of said motor extends longitudinally of said frame and is journaled in bearings 33 on the frame. Said shaft is provided with comparatively fine screw-threads, and two weights 34 and 35 are actuated by said threads in such a manner that when the motor is in service the weights will travel longitudinally of the shaft 32. These weights will both travel in the same direction when the motor is rotating forwardly, and if the motor is then reversed both weights will travel in the opposite direction. The beam 3 will be in balance when the conditions referred to in the description of Fig. 1 are established; namely, when the level in cylinders 1 and 2 is at the same height and there is no flow, the weights 34 and 35 at such times being at equal distances from the motor 31 which is mounted on the center of the frame 30. The conductors which energize the motor 31 consist of two rods or arms 36 and 37 that coöperate with a three-pole switch N P N. When the beam 3 is in balance the circuit will be broken, but if the level of the liquid in cylinder 2 rises the beam will oscillate, and the conducting arms 36 and 37 on the frame 30 will engage the lower two of the contacts of the three-pole switch, thus starting the motor and causing the weights 34 and 35 to travel far enough to the left to balance the difference in weight of the water in cylinders 1 and 2 and restore the equipoise of the system when the conducting rods 36 and 37 are disengaged from the contacts of the switch, the motor coming to rest as soon as the circuit is broken and the weights 34 and 35 remaining in the position to which they have been moved until another change in level of 1 and 2 occurs. If now the level in cylinder 2 falls or the difference between the levels 1 and 2 becomes less, then the beam 3 will oscillate in the opposite direction and the arms 36 and 37 will engage the upper two contacts of the three-pole switch, thus reversing the current in the field of the motor and starting the motor backwardly or on its reverse motion so that the weights 34 and 35 will travel to the right until the beam is again in balance, the circuit being broken when the equipoise of the beam is restored and the weights remaining in the position to which they have been moved until the level in the cylinders 1 and 2 is again disturbed. The weight 34 is provided with a recording pen or needle 38 that coöperates with the chart on a drum 39 which is driven by a clock-work 40, or some other suitable device, so as to record the rate of flow through the conduit 17, indicated by the Pitot tube.

While I have shown these particular forms of my invention I do not wish to be limited thereto it being apparent to those skilled in the art that numerous and extensive departures from the form and the details thereof may be made without departing from the spirit of this invention, these forms having been shown solely for the purpose of illustrating specific embodiments thereof.

Having thus described my invention, what I claim as new and desire to secure by Letters Patent is:

1. In an apparatus of the character described, a hollow beam, hollow cylinders or receptacles suspended from said beam and communicating with the interior thereof, a Pitot tube communicating with said cylinders and with a stream of flowing liquid so as to permit the liquid to enter said cylinders, an adjustable closed tank with which said Pitot tube communicates, means for establishing communication between said tank and hollow beam, means for restoring the equipoise of said beam after its equilibrium has been destroyed by a variation in the flow of the liquid with which the Pitot tube communicates, and means for recording the movements of said beam.

2. In an apparatus of the character described, a hollow beam, hollow cylinders suspended from said beam and communicating with the interior thereof, a Pitot tube consisting of a velocity tube that communicates with one of said cylinders and a static tube that communicates with the other cylinder, a closed tank communicating with said velocity and static tubes, means for establishing communication between said tank and beam, a weight associated from said beam, a receptacle in which said weight is arranged, means operated by said beam for controlling the admission and escape of fluid to and from said receptacle to restore the equilibrium of said beam, and a tank communicating with said receptacle and having a float arranged therein that is provided with a recording device.

3. In an apparatus of the character described, the combination of a fluid main having fluid flowing therethrough under pressure, means in said main to create a fluid pressure difference proportional to the flow of fluid through the main, a plurality of pressure cells, two of which are movable, a third of said pressure cells and a weight suspended therein acted upon by and movable in response to changes in pressure in said third cell, another source of fluid pressure, an outlet for fluid flow of adequate high and low pressure range, a passage-way from said source to said outlet, a connection from said passage-way to said third cell, a valve in said passage-way and a movable member acted upon by the said two first named movable pressure cells and the last named weight to operate said valve.

4. In an apparatus of the character described, the combination of a movable member, a plurality of pressure cells suspended from said member, a plurality of sources of fluid pressure, means to connect each source to one of said cells, fluid pressure from said sources being transmitted to said cells, another pressure cell, mechanism to transmit pressure therefrom to said movable member, another source of fluid pressure, an outlet of adequate high and low pressure range, a passage-way from said other source to said outlet, a connection from said passage-way to said last named pressure cell and a valve in said passage-way controlled by the movable member.

5. In an apparatus of the character described, the combination of a movable member, a plurality of sources of variable fluid pressure, mechanism for transmitting pressures from said sources to said member, including a plurality of pressure cells suspended from said member, an outlet of fluid flow, a passage-way from one of said sources of pressure to said outlet and a valve controlling the passage-way governed by said movable member.

6. In an apparatus of the character described, the combination of a movable member, a plurality of sources of variable fluid pressure, apparatus to transmit to said member fluid pressure from said sources including a pressure cell suspended from said member and movable therewith, said member moving in response to changes in pressure transmitted to it, an outlet for fluid flow, a passage-way from one of said sources to said outlet, and a valve controlling said passage-way governed by said movable member.

7. In an apparatus of the character described, the combination of a movable member, a plurality of pressure cells suspended therefrom, another pressure cell, means to transmit to said member the effects of variations in pressure in said cells, sources of variable fluid pressure connected with said cells, an outlet for fluid flow, a duct connecting one of said sources and said outlet, means to connect said duct and said outlet and a valve controlling said duct governed by said movable member.

8. In apparatus of the character described, the combination of a hollow pivoted movable beam, a plurality of hollow pressure cells suspended from said beam and communicating therewith, sources of fluid pressure connected to said cells, a third pressure cell, means to transmit pressure effects from said cell to said beam, another source of fluid pressure, a duct connecting said other source and said last named cell and a valve controlling said duct governed by said beam.

In testimony whereof I hereunto affix my signature in the presence of two witnesses, this twentieth day of December 1909.

GEORGE G. EARL.

Witnesses:
C. TALEN,
JOHN C. BARTLEY.